United States Patent [19]

Murakami

[11] Patent Number: 5,335,097
[45] Date of Patent: Aug. 2, 1994

[54] COLOR TONE CORRECTING APPARATUS

[75] Inventor: Shigeo Murakami, Kyoto, Japan

[73] Assignee: Dainippon Screen Mfg. Co., Ltd., Kyoto, Japan

[21] Appl. No.: 39,680

[22] Filed: Mar. 30, 1993

[30] Foreign Application Priority Data

Apr. 21, 1992 [JP] Japan .................................. 4-129542
Nov. 27, 1992 [JP] Japan .................................. 4-341689
Nov. 27, 1992 [JP] Japan .................................. 4-341690

[51] Int. Cl.$^5$ .................... H04N 1/46; G03F 3/08
[52] U.S. Cl. ........................... 358/520; 358/518; 358/537; 358/515
[58] Field of Search ............... 358/518, 504, 512, 519, 358/520, 537, 515, 501

[56] References Cited

U.S. PATENT DOCUMENTS

| | | | |
|---|---|---|---|
| 4,623,973 | 11/1986 | Hoffrichter et al. | 358/520 |
| 4,642,682 | 2/1987 | Orsburn et al. | 358/520 |
| 4,916,531 | 4/1990 | Genz et al. | 358/520 |
| 5,130,935 | 7/1992 | Takiguchi | 364/526 |
| 5,204,665 | 4/1993 | Bollman et al. | 358/515 |
| 5,204,948 | 4/1993 | Kato | 358/520 |

FOREIGN PATENT DOCUMENTS

0070680A1  1/1983  European Pat. Off. .
0160548    11/1985 European Pat. Off. .
0226959A3  7/1987  European Pat. Off. .
WO9108642  6/1991  PCT Int'l Appl. .
2117902A   10/1983 United Kingdom .

Primary Examiner—Edward L. Coles, Sr.
Assistant Examiner—Kimberly A. Williams
Attorney, Agent, or Firm—Lowe, Price, LeBlanc & Becker

[57] ABSTRACT

Where color components of output signals are RGB signals, a pixel in an original image displayed on a monitor screen is designated to designate RGB signals of a color to be corrected. At the same time, RGB signals of a target color are inputted through a data input device. An effective range of tone correction processing is designated through the data input device based on hue H, saturation S and lightness L with reference to the color to be corrected. Default values are used as an alternative to the designation. The RGB values of pixels in the original image are converted into HSL values to determine whether the pixels are within the effective range expressed by the HSL values. If the pixels are within the effective range, a tone correction is effected by applying parameters derived from the color to be corrected (RGB signals) and target color (RGB signals) to the RGB signals of the pixels. These parameters are amended to be the smaller toward boundaries of the effective range.

38 Claims, 7 Drawing Sheets

FIG.6
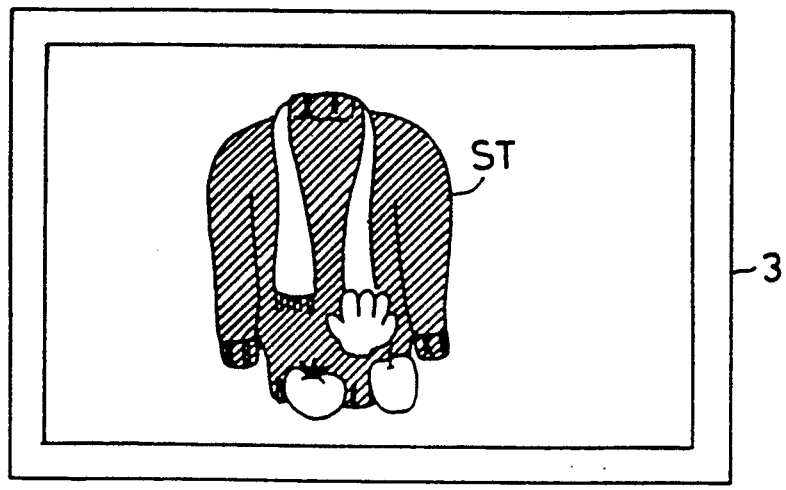
FIG.7
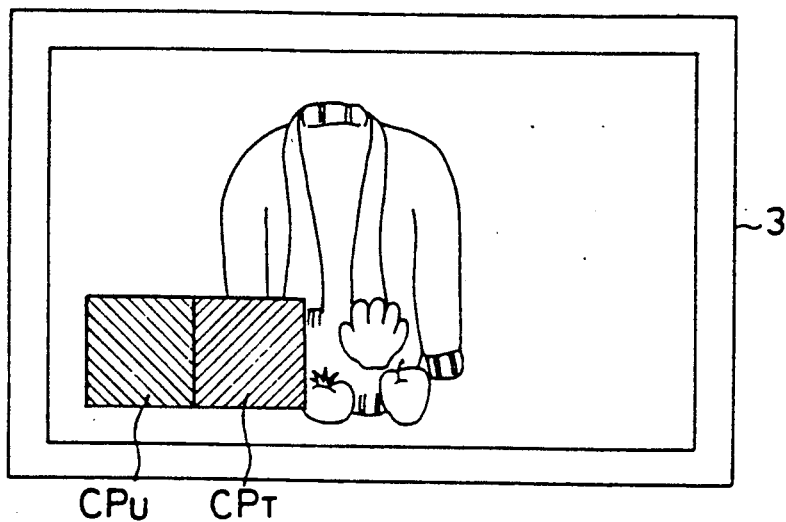
FIG.8A
| | |
|---|---|
| Ru: | 150 |
| Gu: | 50 |
| Bu: | 86 |
| Rt: | 100 |
| Gt: | 90 |
| Bt: | 15 |
FIG.8B
| | |
|---|---|
| Ru: | 59 (%) |
| Gu: | 20 (%) |
| Bu: | 34 (%) |
| Rt: | 39 (%) |
| Gt: | 35 (%) |
| Bt: | 6 (%) |

Error in Effective
Range Designation
Set $|H_{1x}-H_u| > |H_{0x}-H_u|$
again.

$C_U$: 150
$M_U$: 50
$Y_U$: 86
$K_U$: 100

$C_T$: 100
$M_T$: 90
$Y_T$: 15
$K_T$: 80

$C_U$: 59 (%)
$M_U$: 20 (%)
$Y_U$: 34 (%)
$K_U$: 39 (%)

$C_T$: 39 (%)
$M_T$: 35 (%)
$Y_T$: 6 (%)
$K_T$: 31 (%)

COLOR TONE CORRECTING APPARATUS

BACKGROUND OF THE INVENTION (1) Field of the Invention

This invention relates to color tone correcting apparatus for converting color component signals forming pixels in an original image into color component signals of desired target colors, thereby to effect a tone correction of the original image. The color component signals to be converted may be those of R (red),G (green) and B (blue) (hereinafter called RGB signals) Of pixels in various video images such as an original image read by a color scanner, or those of C (cyan), M (magenta), Y (yellow) and K (black) (hereinafter called CMYK signals) converted from the RGB signals for plate-making purposes.

(2) Description of the Related Art

Generally, a color tone correction is carried out by correcting color component signals forming pixels in an original image to convert the pixels into color component signals of a target color.

Where, for example, the pixels are formed of RGB signals of the additive primaries, predetermined parameters are applied to the RGB signals of an original image. Specifically, the parameter applied to the R signal is given an increased value to increase the red component of the original image, and the parameter applied to the G signal is given an increased value to increase the green component of the original image. Such parameters are applied to the RGB signals of the original image in converting these signals into RGB signals of a target color to effect a tone correction of the original image. It will be appreciated that the parameters applied in respect of individual pixels in the original image will result in an enormous amount of computation. Thus, tone correction is often carried out using a lookup table which applies predetermined parameters to different values of the RGB signals.

When it is desired to effect a tone correction of only a particular region of the original image, a pointing device such as a mouse is used to designate the particular region. Then the above parameters are applied only to the RGB signals of the designated region.

However, it is a difficult and troublesome operation to designate such a particular geometric region. For example, a change in the color of a red sweater in the original image may be desired while leaving the red color of an apple appearing adjacent thereto unchanged. It is necessary in this case to operate a pointing device such as a mouse along the outline of the sweater to determine a region to be subjected to a tone correction. This results in a disadvantage of an extended time required for tone correction processing.

Under the circumstances, a method has been proposed in which a region in a color space is designated, instead of designating a geometric region as above, and tone correction processing is carried out only for pixels within this region. Preferably, the color space is an HSL color space using, in a three-dimensional coordinate system, hue H, saturation S and lightness L, which are the three attributes of colors perceptible by humans. An apparatus for executing the proposed method converts the values of RGB signals of pixels in an original image into HSL values, and determines whether these values are included in a designated range of HSL color space. The HSL values of the pixels within this region are corrected and converted back to the original RGB signals.

However, such an apparatus requires means (such as a lookup table) for converting the values of RGB signals into HSL values, and an additional lookup table acting as means for converting the HSL values back to the values of RGB signals. The lookup tables must have a sufficient level of precision to render the two conversions reversible. A memory of large capacity is also required for storing these tables. All these result in a costly tone correcting apparatus.

The designation of a particular geometric region or the designation of a particular region in a color space may be made in an original image showing smooth, gradual variations throughout. In this case also, color conversion is effected for the designated region by using the parameters. This entails the disadvantage of producing an unnatural image with colors changing abruptly across boundaries of that region.

On the other hand, numerous methods and apparatus have been proposed for converting RGB signals of an original color image displayed on a color monitor or the like into the subtractive primaries (CMY signals) and black (K signal) for plate-making purposes, and effecting a tone correction of the CMYK signals after the conversion. However, an apparatus simple to operate and assuring a satisfactory image quality has not been put to practical use yet.

A color scanner for use in plate-making, for example, provides a satisfactory image quality. With the plate-making color scanner, RGB signals of an original image are converted into CMYK signals by masking processing, and thereafter a tone correction is effected using its tone correcting function called color correction.

In the masking processing, the RGB signals (Rx, Gx and Bx) of pixels in the original image are converted into CMYK signals (Cx, Mx, Yx and Kx) by means of the following RGB/CMYK converting equations, for example:

$$Cx = a_{11}Rx - a_{12}Gx - a_{13}Bx$$

$$Mx = -a_{21}Rx + a_{22}Gx - a_{23}Bx$$

$$Yx = -a_{31}Rx - a_{32}Gx + a_{33}Bx$$

$$Kx = MAX(Cx, Mx, Yx)$$

where $a_{ij}$ (i=1 to 3, j=1 to 3) is a predetermined coefficient (positive value), and MAX (Cx, Mx, Yx) is a function to pick out the greatest of Cx, Mx and Yx.

The respective parts of the Cx, Mx, Yx and Kx signals converted through the above equations may be separated into six types of color signals $\Delta C$, $\Delta M$, $\Delta Y$, $\Delta R$, $\Delta G$ and $\Delta B$ of C (cyan), M (magenta), Y (yellow), R (red), G (green) and B (blue). These may be expressed as follows:

$$Cx = Cx' \pm \beta_{11}\Delta C \pm \beta_{12}\Delta M \pm \beta_{13}\Delta Y \pm$$
$$\beta_{14}\Delta R \pm \beta_{15}\Delta G \pm \beta_{16}\Delta B$$

$$Mx = Mx' \pm \beta_{21}\Delta C \pm \beta_{22}\Delta M \pm \beta_{23}\Delta Y \pm$$
$$\beta_{24}\Delta R \pm \beta_{25}\Delta G \pm \beta_{26}\Delta B$$

$$Yx = Yx' \pm \beta_{31}\Delta C \pm \beta_{32}\Delta M \pm \beta_{33}\Delta Y \pm$$
$$\beta_{34}\Delta R \pm \beta_{35}\Delta G \pm \beta_{36}\Delta B$$

-continued
$$Kx = Kx' \pm \beta_{41}\Delta C \pm \beta_{42}\Delta M \pm \beta_{43}\Delta Y \pm$$
$$\beta_{44}\Delta R \pm \beta_{45}\Delta G \pm \beta_{46}\Delta B$$

where $\beta ij$ (i=1 to 4, j=1 to 6) shows a variable coefficient in each case.

In the color correction, coefficient $\beta ij$ is adjusted to effect a tone correction of Cx, Mx, Yx and Kx signals.

That is, a control panel connected to a circuit for operating the above equations includes 24 knobs for adjusting coefficient $\beta ij$. The operator adjusts each knob to vary coefficient $\beta ij$ for a desired tone correction.

However, the color correction is difficult to control, and only a highly skilled operator can successfully carry out a desired tone correction. Moreover, where the color the operator desires to correct lies in boundaries of the six hues (C, M, Y, R, G and B), for example, these hues overlap one another in a complex manner. In such an instance, a very high level of technique is required to carry out a tone correction.

A tone correction based on the color correction does not include elements for determining lightness or saturation. This results in the disadvantage that the tone correction is unavailable where, for example, correction of only a light red part in output signals is desired.

SUMMARY OF THE INVENTION

The present invention has been made having regard to the above-noted state of the art. A primary object of the invention, therefore, is to eliminate the various drawbacks noted above and provide a color tone correcting apparatus which is easy to operate and which positively reflects intentions of the operator.

More particularly, the invention intends to provide a tone correcting apparatus which does not require a memory to have a large capacity while determining an effective range of tone correction processing based on a region in a color space to facilitate an operation where the color components of output signals are RGB signals, and which does not impair the smoothness of tone variations when effecting a tone correction of a particular region of an original image having smoothly varying image signals.

Another object of the present invention is to provide a tone correcting apparatus which is easy to operate and capable of determining a tone correction based on lightness and saturation where the color components of output signals are CMYK signals converted from RGB signals.

The above objects are fulfilled, according to a first aspect of the present invention, by a color tone correcting apparatus for effecting a color tone correction of an original image, where color components of output signals are signals (RGB signals) of R (red), G (green) and B (blue), by converting the RGB signals into RGB signals of a target color, the apparatus comprising:

original image data storage means for storing digitalized RGB signals of pixels in the original image;

an image data conversion table for converting the RGB signals into three attribute values (i.e. hue H, saturation S and lightness L: HSL values) of perceived colors;

processing condition designating means for designating a color to be corrected and to act as a central object for tone correction processing, and for designating a target color resulting from the tone correction;

effective range determining means for determining, from the HSL values, an effective range of the tone correction processing with reference to the color to be corrected;

parameter computing means for computing parameters for use in the tone correction processing based on the color to be corrected and the target color designated by the processing condition designating means;

object pixel determining means for determining pixels subjected to the tone correction processing by comparing the HSL values obtained by applying the RGB signals of pixels in the original image stored in the original image data storage means to the image data conversion table, and the HSL values determined by the effective range determining means and indicative of the effective range of tone correction processing; and tone correction processing means for effecting the tone correction processing by applying the parameters computed by the parameter computing means to the RGB signals of pixels determined by the object pixel determining means to be objects of the tone correction processing.

When the color components of output signals are RGB signals, the apparatus in the first aspect of the invention can avoid enlargement of the capacity of the storage means while determining a tone correction designation from a region in a color space.

That is, in this apparatus, the object pixel determining means compares the HSL values obtained by applying the RGB signals of pixels in an original image to the image data conversion table, and the HSL values indicative of an effective range of tone correction processing. The tone correction processing means effects the tone correction processing by applying the parameters computed by the parameter computing means to the RGB signals of pixels determined to be within the effective range.

Thus, the RGB signals are converted into HSL values in order only to determine pixels to be subjected to the tone correction processing. The tone correction processing is carried out for the RGB signals of the object pixels. Consequently, it is adequate to provide the single image data conversion table for converting the RGB signals into HSL values. The storage means does not need an enlarged capacity while allowing an effective range of processing to be inputted by means of the HSL values which are values relating to the color space.

The HSL values showing an effective range of tone correction processing may be designated with numeric values (HSL values), with HSL values obtained by applying to the image data conversion table the RGB signals of pixels showing the effective range and designated in the original image displayed on display means, or with default values of the HSL values showing an effective range.

The above apparatus in the first aspect of the invention may further comprise parameter amending means for computing differences between the HSL values of pixels corresponding to the color to be corrected and the HSL values of pixels determined by the object pixel determining means to be subjected to the tone correction processing, and amending the parameters for the tone correction processing such that the larger the differences are, the smaller the parameters are made. Then, a particular region of the original image having smoothly varying image signals may undergo a tone correction without losing the smoothness.

The HSL values (hsl) of the pixels determined by the object pixel determining means to be the objects of the tone correction are values found within the effective range based on a color to be corrected. The differences between these values and HSL values of the pixels corresponding to the color to be corrected are minimum when (HSL)=(hsl), and become the larger the closer (hsl) are to critical values of the effective range, i.e. to a boundary between object pixels for the tone correction processing and non-object pixels in the color space.

Since the parameter amending means amends the parameters such that the larger the above differences are, the smaller the parameters become, the intensity of the tone correction processing by the tone correction processing means using these parameters is minimum at the boundary between object pixels and non-object pixels, and becomes the greater the closer the object pixels are to the pixels corresponding to the color to be corrected.

Consequently, no abrupt change in color occurs across the boundary between object pixels and non-object pixels in the image resulting from the tone correction processing.

The apparatus in the first aspect of the invention may further comprise a display means operable to display the color to be corrected and to act as the central object of the tone correction processing and the target color resulting from the tone correction, as designated by the processing condition designating means. This provides a convenience in practice of allowing the difference between the two colors to be confirmed on the display means.

According to a second aspect of the present invention, there is provided a color tone correcting apparatus for effecting a color tone correction of an original image, where color components of output signals are signals (CMYK signals) of C (cyan), M (magenta), Y (yellow) and K (black), by converting the CMYK signals into CMYK signals of a target color, the apparatus comprising:

original image data storage means for storing digitalized color component signals (RGB signals) of R (red), G (green) and B (blue) of pixels in the original image;

RGB/CMYK converting means for converting the RGB signals into the CMYK signals;

an image data conversion table for converting the RGB signals into three attribute values (i.e. hue H, saturation S and lightness L: HSL values) of perceived colors;

processing condition designating means for designating RGB signals (signals to be corrected) of a color to be corrected and to act as a central object for tone correction processing from the RGB signals stored in the original image data storage means, and for designating CMYK signals (target signals) of a target color resulting from the tone correction effected for the color to be corrected;

effective range determining means for determining, from the HSL values, an effective range of the tone correction processing with reference to the color to be corrected;

parameter computing means for computing parameters for use in the tone correction processing based on CMYK signals for the tone correction converted by the RGB/CMYK converting means from the signals designated by the processing condition designating means to be corrected, and the target signals designated by the processing condition designating means;

object pixel determining means for determining pixels subjected to the tone correction processing by comparing the HSL values obtained by applying the RGB signals of pixels in the original image stored in the original image data storage means to the image data conversion table, and the HSL values determined by the effective range determining means and indicative of the effective range of tone correction processing; and tone correction processing means for effecting the tone correction processing by applying the parameters computed by the parameter computing means to the CMYK signals of pixels determined by the object pixel determining means to be objects of the tone correction processing among the CMYK signals obtained by successively applying the RGB signals of pixels of the original image stored in the original image data storage means to the RGB/CMYK converting means.

When the color components of output signals are CMYK signals, the apparatus in the second aspect of the invention is easy to control, and allows the tone correction to be determined from lightness and saturation.

That is, in this apparatus, the object pixel determining means compares the HSL values showing an effective range of tone correction processing determined by the effective range determining means, and the HSL values obtained by applying the RGB signals of pixels in an original image to the image data conversion table, to determine whether these pixels are to be subjected to the tone correction. The tone correction processing means effects the tone correction processing for the CMYK signals of the pixels determined to be the objects of the tone correction processing among the CMYK signals converted from the RGB signals of the original image applied to the RGB/CMYK converting means, by applying thereto the tone correction parameters computed by the parameter computing means, based on the RGB signals of the color to be corrected and the CMYK signals of the target color designated by the processing condition designating means.

The pixels subjected to the tone correction processing are determined with reference to an HSL color space having three-dimensional coordinates of hue H, saturation S and lightness L which are the three attributes of colors perceived by humans. This allows the operator to carry out a desired tone correction by designating an effective range covering, for example, only light red portions of an original image. Moreover, the operator may carry out the tone correction with great facility simply by designating signals to be corrected, target signals, and an effective range of tone correction processing.

BRIEF DESCRIPTION OF THE DRAWINGS

For the purpose of illustrating the invention, there are shown in the drawings several forms which are presently preferred, it being understood, however, that the invention is not limited to the precise arrangements and instrumentalities shown.

FIG. 6 is a view showing a distribution in an original image of RGB signals of a color designated as a color to be corrected;

FIG. 7 is a view showing examples of color patches displayed;

FIGS. 8A and 8B are views each showing an example of menu screens for designating a target color with numeric values of RGB signals;

DETAILED DESCRIPTION OF THE PREFERRED EMBODIMENTS

Preferred embodiments of the present invention will be described in detail hereinafter with reference to the drawings.

FIRST EMBODIMENT

Figure 1:
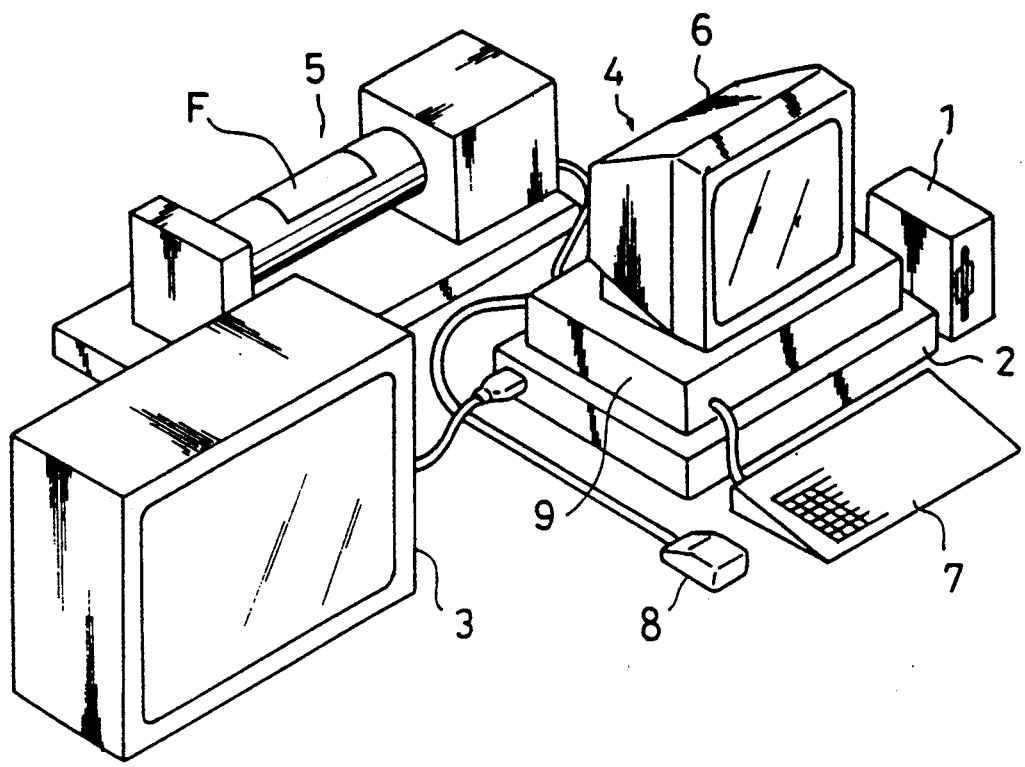
FIG. 1 is a perspective view showing an outward appearance of a tone correcting apparatus in a first embodiment (and a second embodiment) of the present invention.

FIG. 1 is a perspective view showing an outward appearance of a tone correcting apparatus in a first embodiment of this invention.

This apparatus is adapted to carry out a tone correction of output signals where color components are RGB signals.

The apparatus includes, as main components thereof, an image monitor 3 for displaying an image subjected to a color tone correction (hereinafter called color correction) and an image resulting from the color correction, a data input device 4, a drive unit 1 for driving a magneto-optical disk storing image data (i.e. a magneto-optical disk driver 1), a frame memory unit 2 having frame memories for storing image data before and after a correction, respectively, an output scanner 5 for recording a color-corrected image on film F, and a computer 9 whose chief function is color correction processing.

The data input device 4 includes a control monitor 6, a keyboard 7 and a mouse 8 for the operator (user of this apparatus) to input data.

Figure 2:
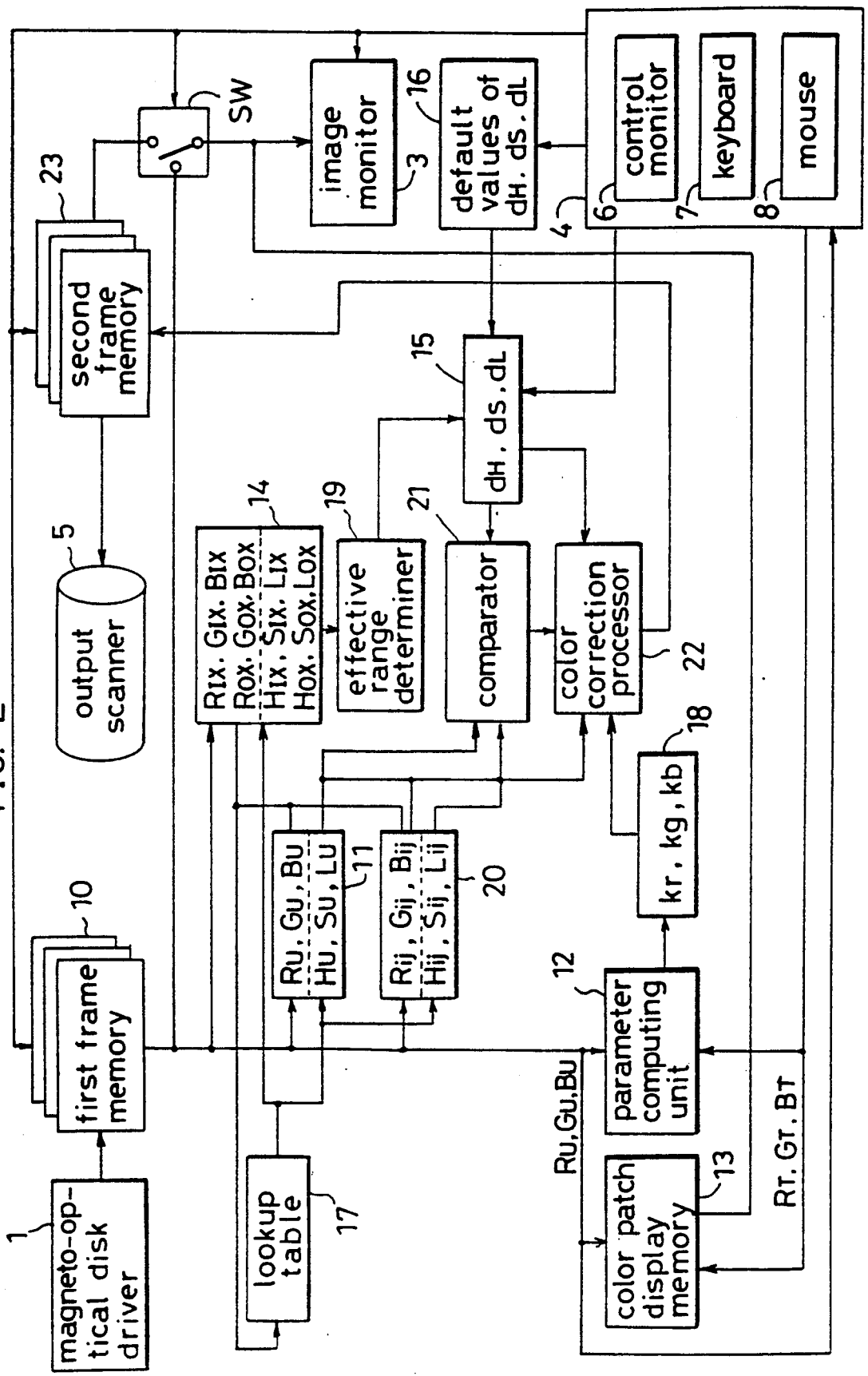
FIG. 2 is a block diagram showing an interior arrangement of the apparatus in the first embodiment.

FIG. 2 is a block diagram of a system of this apparatus. The construction and operation of this apparatus will be described with reference to this block diagram, and in combination with controls made by the operator.

It is to be noted that FIG. 2 shows the part of functions of the computer 9 relating to color correction processing independently in the block diagram. The functions to carry out other types of processing, such as processing to output and display data on the control monitor 6 and processing to output color-corrected images to the output scanner 5, are assigned to the data input device 4 and output scanner 5, respectively.

The magneto-optical disk driver 1 acts to take digitalized image signals of an image to be processed (hereinafter called an original image) into this apparatus. Although it is assumed that original image signals are stored on a magneto-optical disk, these signals may be stored on a magnetic tape or a hard disk. In the latter case, the magneto-optical disk driver 1 is replaced with a drive unit for accessing the alternative storage medium. Further, the device for taking digitalized image signals of an original image into this apparatus may be an input scanner (not shown). In this case, original image signals of the three colors separated by the input scanner are stored directly in a first frame memory 10 described hereinbelow.

The first frame memory 10 has a capacity to store, in each frame, original image signals, i.e. color component signals of R (red), G (green) and B (blue), of one original image read through the magneto-optical disk driver 1.

The original image signals in the first frame memory 10 are outputted through an internal switch SW to the image monitor 3 to display the image thereon.

Figure 3:
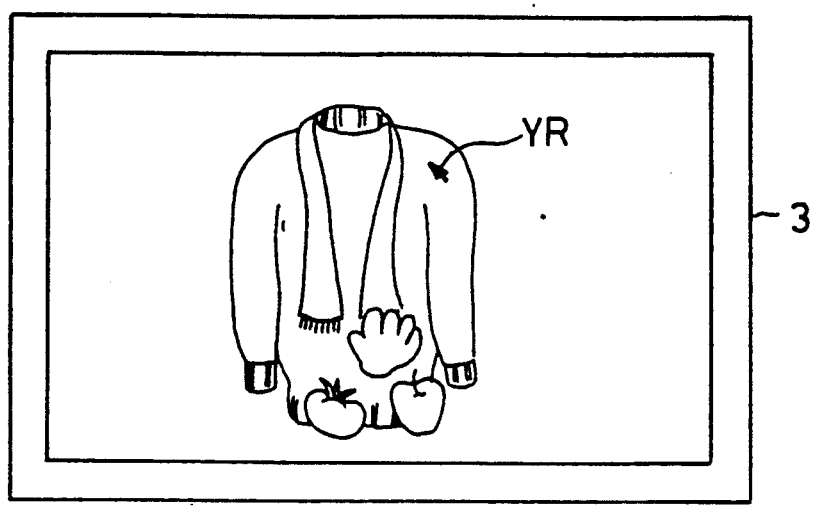
FIG. 3 is a view showing a way in which a mouse is used to designate a color to be corrected in an original image displayed on an image monitor.

The operator controls a pointing device such as the mouse 8 of the data input device 4 while looking at the screen of the image monitor 3, to move an arrow YR on the screen to a position of a color the operator desires to correct, as shown in FIG. 3. The operator then clicks a button on the mouse 8 to designate the color to be corrected. When the color to be corrected is designated, the data input device 4 outputs coordinate data of the point designated on the screen of the image monitor 3 as an address for reading by the first frame memory 10.

It is assumed here that the color component signals of R, G and B read are Ru, Gu and Bu signals.

Figure 4A:
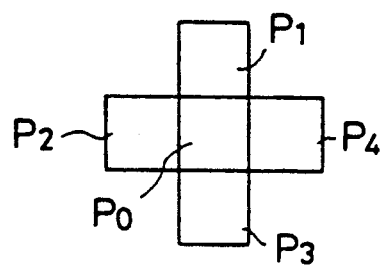
FIGS. 4A and 4B are views each showing a designated pixel and surrounding pixels.
Figure 4B:
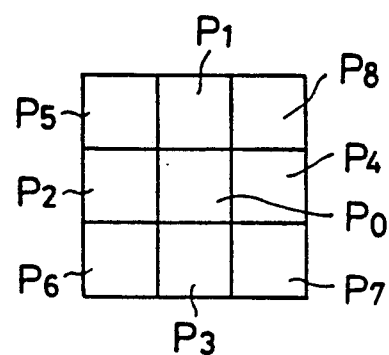

Although the Ru, Gu and Bu signals are the RGB signals of the point (pixel) designated with the mouse 8, the color of the point designated by the operator, i.e. the color to be corrected as seen in the eyes of the operator, strictly speaking, does not consist in the color of the designated point alone but is influenced by colors surrounding the designated point. Thus, as shown in FIGS. 4A and 4B, the Ru, Gu and Bu signals may be based on average values of RGB signals of four adjacent pixels P1–P4 (FIG. 4A) or eight pixels P1–P8 (FIG. 4B) around the point P0 designated with the mouse 8.

Figure 5A:
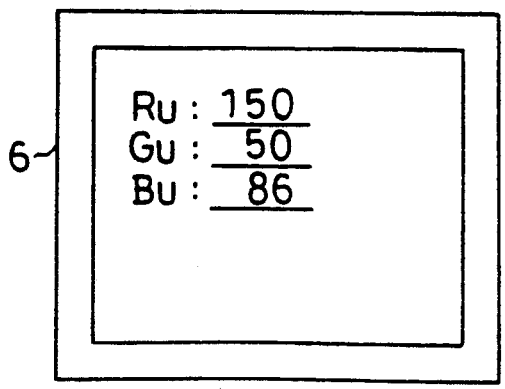
FIGS. 5A and 5B are views each showing an example of input screens for inputting numeric values of RGB signals to designate a color to be corrected.
Figure 5B:
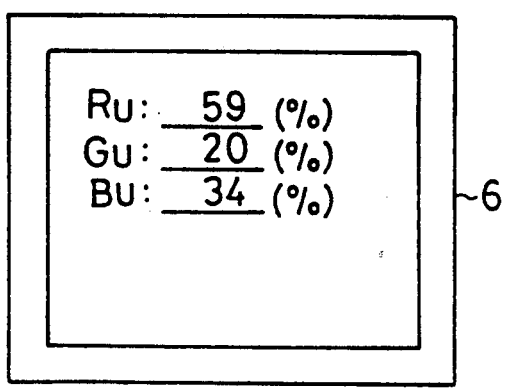

The Ru, Gu and Bu signals may be determined, for example, by inputting values of RGB signals directly through the keyboard 7 while looking at an input screen displayed on the control monitor 6, instead of operating the mouse 8 to designate a pixel in the original image displayed on the image monitor 3. In this case, if the RGB signals stored in the first frame memory 10 are 8-bit digital signals, the Ru, Gu and Bu signals may be designated with numeric values "0 to 255" to which the digital signals are decimalized, as shown in FIG. 5A. Alternatively, the Ru, Gu and Bu signals may be designated with values in percentage "0 to 100(%)" corresponding to the values "0 to 255" as shown in FIG. 5B.

As shown in FIG. 6, all the pixels in the original image corresponding to the Ru, Gu and Bu signals of the color to be corrected may be highlighted by a special color or by flashing. This allows the operator readily to grasp a distribution of the color to be corrected in the original image, for convenience in confirming a region subjected to a color correction on the screen. In FIG. 6, a sweater ST shown in hatching is displayed in the special color or flashed.

The Ru, Gu and Bu signals are stored in a first pixel value memory 11, and outputted to a parameter computing unit 12, a color patch display memory 13 and the data input device 4.

These memories and other memories described hereinafter are present as part of a storage region in an internal memory (main storage) of the computer 9. The computing units correspond to a CPU (central processing unit) for executing a program based on a processing algorithm.

The color patch memory 13 stores the Ru, Gu and Bu signals at addresses corresponding to a predetermined region (e.g. a region in a lower left corner) on the screen of the image monitor 3 as shown in FIG. 7. These signals are outputted to the image monitor 3 to display a color patch CPu of the color to be corrected as superposed on the original image.

The color patch refers to a predetermined region on the image monitor 3 filled with a color designated for correction, to enable the operator to observe the designated color independently of the original image.

Where, as noted hereinbefore, the Ru, Gu and Bu signals are designated with numeric values inputted through the keyboard 7, a designated color for correction (color patch) is displayed on the image monitor 3 in real time. This enables the operator to grasp instantly a correlation between the numeric values of the Ru, Gu and Bu signals designated and a color to be corrected as envisaged by the operator. If the color patch differs from the color envisaged, the operator may vary the numeric vales of Ru, Gu and Bu signals to designate the color to be corrected easily and accurately.

The data input device 4 having received the Ru, Gu and Bu signals converts these signals into numeric values, and outputs the values to the control monitor 6 for display.

Where the RGB signals stored in the first frame memory 10 are 8-bit digital signals, the Ru, Gu and Bu signals may be expressed by the numeric values "0 to 255" or by values in percentage "0 to 100(%)" corresponding to the values "0 to 255" as noted hereinbefore.

The operator refers to the color patch of the color to be corrected as displayed on the image monitor 3, and the numeric values of Ru, Gu and Bu signals displayed on the control monitor 6, and inputs through the keyboard 7 numeric values of RGB signals of a color resulting from the correction processing (hereinafter called a target color) as shown in FIG. 8A (in the expression of "0 to 255") and FIG. 8B (in the expression of "0 to 100(%)").

The data input device 4 produces RGB signals corresponding to the values inputted, and outputs the signals to the color patch display memory 13 and parameter computing unit 12. The RGB signals of the target color is hereinafter called Rt, Gt and Bt signals.

The color patch display memory 13 stores the Rt, Gt and Bt signals in a storage location (e.g. a location corresponding to a display region next to the region of the color patch showing the color to be corrected) having a storage region corresponding to the one storing the Ru, Gu and Bu signals. The Rt, Gt and Bt signals are outputted to the image monitor 3 for display of a color patch $CP_T$ of the target color in superposition on the original image (see FIG. 7).

In this way, once the operator inputs the values of Rt, Gt and Bt signals, the image (color patch) corresponding to these values appears in real time on the image monitor 3. This enables the operator to grasp instantly a correlation between the numeric values of the Rt, Gt and Bt signals designated and a target color envisaged by the operator. If the color patch differs from the target color envisaged, the operator may vary the numeric vales of Rt, Gt and Bt signals to designate the target color easily and accurately.

The target color may be designated, for example, by operating the mouse 8 to designate a pixel in the original image displayed on the image monitor 3 as in designating a color to be corrected (see FIG. 3), instead of inputting numeric values of Rt, Gt and Bt signals directly through the keyboard 7. In this case, the RGB signals stored at the addresses in the first frame memory 10 corresponding to the designated point on the screen of the image monitor 3 are read as the Rt, Gt and Bt signals. As in the case of designating a color to be corrected, the Rt, Gt and Bt signals may be based on average values of RGB signals of four adjacent pixels P1-P4 (FIG. 4A) or eight surrounding pixels P1-P8 (FIG. 4B).

When designation of the color to be corrected and target color is completed, the operator designates an effective range of correction from the original color to the target color.

Figure 9:
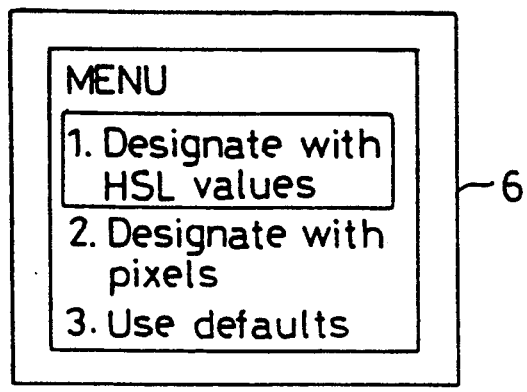
FIG. 9 is a view showing an example of menus for selecting a method of designating an effective range of tone correction processing.

In this apparatus, an effective range is determined by using HSL values or by designating a pixel or pixels in the original image, or default values may be used instead of designating an effective range. The operator selects the effective range designation with the HSL values, or with a pixel or pixels in the original image, or use of the default values, on a menu screen displayed on the control monitor 6 as shown in FIG. 9, through the keyboard 7 or otherwise. The selection may be made by moving a frame to a choice item by operating cursor keys or the like on the keyboard 7 and pressing the return key or the like.

Figure 10:
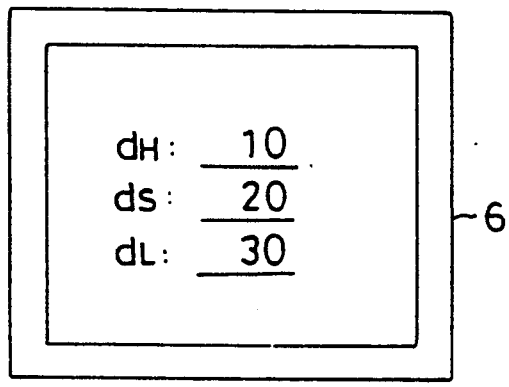
FIG. 10 is a view showing an example of input screens for designating an effective range of tone correction processing with HSL values.

When the HSL values are used for designation, values of dH, dS and dL as shown in FIG. 10 are inputted through the keyboard 7 and stored in an effective range memory 15. These values are expressed by $Hu \pm dH$, $Su \pm dS$ and $Lu \pm dL$, where Hu is hue, Su is saturation and Lu is lightness corresponding to the Ru, Gu and Bu signals of the color to be corrected.

When the designation is made with a pixel or pixels in the original image, the mouse 8 is operated to designate a pixel or pixels in the original image displayed on the image monitor 3 as when designating a color to be corrected (see FIG. 3).

Figure 11:
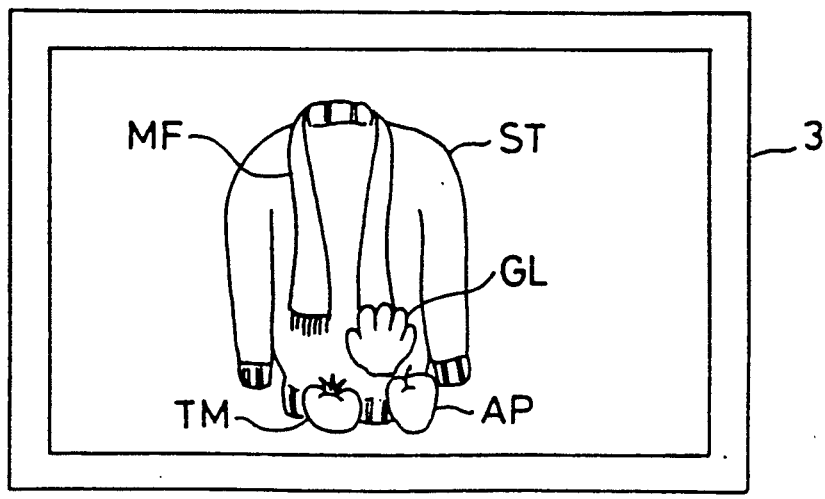
FIG. 11 is an explanatory view showing a method of designating an effective range of tone correction processing with pixels in the original image.

This designation mode has a number of variations, which will be described with reference to FIG. 11. It is assumed, for example, that the color (Ru, Gu, Bu) of a certain part of the red sweater in the original image is designated to be the color for correction.

(1) Designate one example of pixels for which a color correction is desired.

Where, for example, a color correction is desired for the red sweater ST and the red of an apple AP adjacent the sweater ST, a pixel of the apple AP in the original image may be designated as an example of pixels subjected to the color correction.

(2) Designate one example of pixels for which a color correction is not desired.

Where, for example, a color correction is not desired for the red of a tomato TM adjacent the red sweater ST, a pixel of the tomato TM in the original image may be designated as an example of pixels to be excluded from the color correction.

(3) Designate one example of pixels for which a color correction is desired and one example of pixels for which the color correction is not desired.

Where, for example, a color correction is desired for the red sweater ST and the red of the apple AP adjacent the sweater ST but not for the red of the tomato TM adjacent the sweater ST, a pixel of the apple AP in the original image may be designated as an example of pixels subjected to the color correction, and a pixel of the tomato TM in the original image may be designated as an example of pixels to be excluded from the color correction.

(4) Designate a plurality of examples of pixels for which a color correction is desired.

Where, for example, a color correction is desired for the red sweater ST, the red of the apple AP and the red of a red muffler MF adjacent the sweater ST, a pixel of the apple AP and a pixel of the muffler MF in the original image may be designated as examples of pixels subjected to the color correction.

(5) Designate a plurality of examples of pixels for which a color correction is not desired.

Where, for example, a color correction is not desired for the red of the tomato TM or the red of a red glove GL adjacent the red sweater ST, a pixel of the tomato TM and a pixel of the glove GL in the original image may be designated as examples of pixels to be excluded from the color correction.

(6) Designate a plurality of examples of pixels for which a color correction is desired, a plurality of examples of pixels for which the color correction is not desired.

Where, for example, a color correction is desired for the red sweater ST, the red of the apple AP and the red of the muffler MF adjacent the sweater ST, but not the red of the tomato TM or the red of the red glove GL adjacent the red sweater ST, a pixel of the apple AP and a pixel of the muffler MF in the original image may be designated as examples of pixels subjected to the color correction, and a pixel of the tomato TM and a pixel of the glove GL in the original image as examples of pixels to be excluded from the color correction.

When the designation is made on the screen of the image monitor 3, the RGB signals stored at the addresses in the first frame memory 10 corresponding to the designated points (examples of pixels subjected to a color correction and/or those excluded from the color correction) are read as $R_1x$, $G_1x$ and $B_1x$ signals (of the examples of pixels subjected to the color correction) and/or $R_0x$, $G_0x$ and $B_0x$ signals (of the examples of pixels excluded from the color correction) (where x is the number of pixels designated), and stored in an effective range pixel value memory 14. Since the pixels may be designated in various ways as noted above, the RGB signals are stored in the effective range pixel value memory 14 according to a selected designating mode.

Based on the $R_1x$, $G_1x$ and $B_1x$ signals and/or $R_0x$, $G_0x$ and $B_0x$ signals stored in the effective range pixel value memory 14, an effective range dH, dS, dL is determined by effective range determination processing described hereinafter, and stored in the effective range memory 15.

Where an effective range is not designated, default values of an effective range stored in a default memory 16 are applied as they are to the effective range memory 15. These default values are stored in the form of dH, dS and dL which can be updated.

This apparatus determines, prior to execution of color correction processing, whether the color components of pixels in the original image stored in the first frame memory 10 are in the effective range of color correction or not. This determination is based on the information thus far inputted or extracted, i.e. "the RGB signals of the color to be corrected (Ru, Gu and Bu signals)", "the RGB signals of the target color (Rt, Gt and Bt signals)" and "the HSL values showing an effective range of color correction, or the pixels showing an effective range of color correction, or the default values of the effective range where no effective range is designated".

In order to determine whether the color components of pixels in the original image are in the effective range of color correction or not, the values of R, G and B are converted into values of hue H, saturation S and lightness L. For this purpose, a lookup table 17 is prepared and stored in the following sequence.

The values of R, G and B, which do not correspond directly to the values of hue H, saturation S and lightness L, are converted into values in "L*a*b color space (This color space is recommended by the Commission Internationale de l'Eclairage (CIE) as an equivalent perceived color space). The values in L*a*b color space are converted into values in HSL color space.

For converting the values of R, G and B for L*a*b color space, tristimulus values Ximax, Yimax and Zimax (i=R, G, B) when maximum values Rmax, Gmax and Bmax of R, G and B are applied to the image monitor 3 are first measured with a spectral radiometer.

Next, the gamma of the image monitor 3 (a constant showing a relationship between input signal and luminous output of a color monitor: hereinafter expressed by sign "t" for expediency) is used to derive, from the following equations, tristimulus values X, Y and Z when given values r, g and b of RGB are inputted:

$$X = \Sigma (j/imax)^t \cdot Ximax$$

:(i=R, G, B, j=r, g, b)

$$Y = \Sigma (j/imax)^t \cdot yimax$$

:(i=R, G, B, j=r, g, b)

$$Z = \Sigma (j/imax)^t \cdot Zimax$$

:(i=R, G, B, j=r, g, b)

In the above equations, as i=R, G, B, so j=r, g, b.

The tristimulus values X, Y and Z are used to convert the values of R, G and B into values in Lab color space, as by the following equations. These converting equations are stipulated by the CIE.

$$L^* = 116 \cdot (Y/Yn)^{\frac{1}{3}} - 16$$

$$a^* = 500 \cdot [(X/Xn)^{\frac{1}{3}} - (Y/Yn)^{\frac{1}{3}}]$$

$$b^* = 200 \cdot [(Y/Yn)^{\frac{1}{3}} - (Z/Zn)^{\frac{1}{3}}]$$

where Yn=ΣYimax (i=R, G, B), Xn=ΣXimax (i=R, G, B), and Zn=ΣZimax (i=R, G, B).

Figure 12:
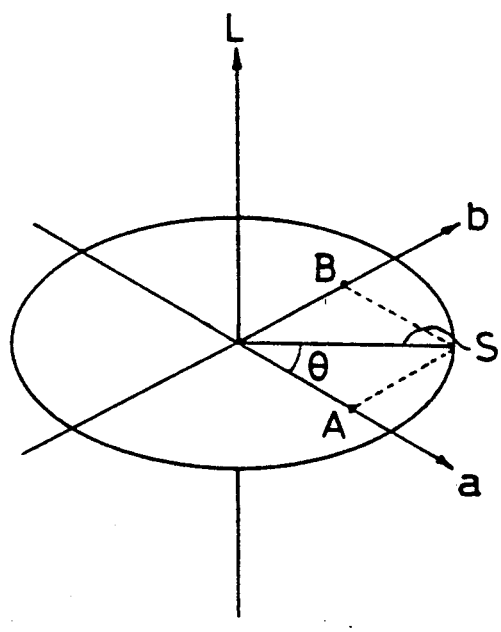
FIG. 12 is a view showing a relationship between an HSL color space and Lab color space having hue, saturation and lightness values in a three-dimensional coordinate system.

FIG. 12 shows a relationship between Lab color space and HSL color space.

In FIG. 12, the L-axis of Lab color space corresponds directly to lightness L of HSL color space, a radius vector on two-dimensional coordinates of the a-axis and b-axis corresponds to saturation S, and an angle $\theta$ between the a-axis and radius vector corresponds to hue H.

Thus, the L value obtained above is regarded as the value of lightness in HSL color space, and saturation S and hue H are derived from the following equations:

$$S^2 = A^2 + B^2$$

$$H = \tan^{-1}(B/A)$$

However, when $A<0$, 180 degrees are added to a result of computation for hue H, and when $A>0$ and $B<0$, 360 degrees are added thereto. This is done in order to avoid results of computation showing negative values.

The values of H, S and L derived from the above operational expressions and corresponding to the values of R, G and B are stored in the lookup table 17 shown in FIG. 2.

However, if the number of bits in the digitalized RGB signals is n, the number of combinations of the values of R, G and B is $n^3$. The values of H S and L corresponding to all of these would make an enormous amount of data. Thus, for example, several lower bits may be deleted from the n-bits to make m-bits (n>m), and the values of H, S and L (which are in n-bits since data need not be deleted therefrom) corresponding to the RGB signals in m-bits may be stored in the lookup table 17.

As noted hereinbefore, the values of RGB signals are converted into the values of HSL color space in order to determine whether the color components of pixels in the original image are within the designated effective range of color correction or not. Since the values of HSL color space obtained by the conversion are not used in the color correction processing, no problem of low precision arises from the reduction in the number of bits of the RGB signals.

Then, only the m-bits left after deleting the several lower bits from the Ru, Gu and Bu signals (in n-bits) of the color to be corrected stored in the first pixel value memory 11 are outputted to the lookup table 17 to obtain the H, S and L values in n-bits. These are expressed as Hu, Su and Lu. The values Hu, Su and Lu are stored in a different storage region of the first pixel value memory 11.

The parameter computing unit 12 having received the Ru, Gu and Bu signals of the color to be corrected and the Rt, Gt and Bt signals of the target color derives from the following equations parameters kr, kg and kb necessary to the color correction processing:

$$kr = Rt/Ru - 1$$

$$kg = Gt/Gu - 1$$

$$kb = Bt/Bu - 1$$

The parameters kr, kg and kb are stored in a parameter memory 18.

An effective range determiner 19 determines an effective range designated with a pixel or pixels. Prior to the determination of the effective range by the effective range determiner 19, only the m-bits left after deleting the several lower bits from $R_1x$, $G_1x$ and $B_1x$ signals and/or $R_0x$, $G_0x$, $B_0x$ signals (stored in the effective range pixel value memory 14) extracted from the pixel or pixels designated, as in the case of the first pixel value memory 11, are outputted to the lookup table 17 to obtain $H_1x$, $S_1x$ and $L_1x$ signals and/or $H_0x$, $S_0x$ and $L_0x$ signals in n-bits. These signals are stored in a different storage region of the effective range pixel value memory 14.

The effective range is determined by various methods depending on the way (1)–(6) in which the pixel or pixels are designated as described hereinbefore. Each method will be described below.

(1) Where one pixel is designated as an example of pixels for color correction, the $R_1x$, $G_1x$ and $B_1x$ signals and $H_1x$, $S_1x$ and $L_1x$ signals (where x=1) are stored in the effective range pixel value memory 14. Absolute differences between the $H_1x$, $S_1x$ and $L_1x$ signals and Hu, Su and Lu which are the HSL values of the color to be corrected, multiplied by $\alpha$ ($\alpha > 1$) are stored in the effective range memory 15 as an effective range dH, dS and dL expressed in HSL values. These values are derived from the following equations:

$$dH = |H_1x - Hu| X\alpha$$

$$dS = |S_1x - Su| X\alpha$$

$$dL = |L_1x - Lu| X\alpha$$

The absolute differences between the $H_1x$, $S_1x$ and $L_1x$ signals and Hu, Su and Lu are multiplied by $\alpha$ for the following reason.

If dH, dS and dL were regarded as absolute differences between the $H_1x$, $S_1x$ and $L_1x$ signals and Hu, Su and Lu, the pixel designated as an example of pixels subjected to the color correction would be on a boundary of the effective range. The color correction for the boundary of the effective range would have no effect when the parameters kr, kg and kb are amended to be KR, KG and KB as described hereinafter, and applied to the respective pixels in the original image. Then, contrary to the operator's intention, the pixel designated as an example of pixels to be color-corrected would not be color-corrected. Absolute differences between the $H_1x$, $S_1x$ and $L_1x$ signals and Hu, Su and Lu are multiplied by $\alpha$ ($\alpha > 1$) to enlarge values of the boundary of the effective range, thereby effecting a sufficient color correction for the pixel designated as an example to be color-corrected. In this embodiment, "2" is set as $\alpha$ though the value of $\alpha$ may be varied as desired.

(2) Where one pixel is designated as an example of pixels for which a color correction is not desired, the $R_0x$, $G_0x$ and $B_0x$ signals and $H_0x$, $S_0x$ and $L_0x$ signals (where x=1) are stored in the effective range pixel H value memory 14. Absolute differences between the $H_0x$, $S_0x$ and $L_0x$ signals and Hu, Su and Lu are stored in the effective range memory 15 as an effective range dH, dS and dL. These values are derived from the following equations:

$$dH = |H_0x - Hu|$$

$$dS = |S_0x - Su|$$

$$dL = |L_0x - Lu|$$

The vales of dH, dS and dL are derived without multiplying by α as distinct from the case (1) above. The reason for this is that the pixel designated as an example for which the color correction is not desired will be on the boundary of the effective range, and it is preferable that the color correction produces no effect on that pixel.

(3) Where one pixel is designated as an example of pixels for color correction, and another pixel as an example of pixels for which the color correction is not desired, the $R_1x$, $G_1x$ and $B_1x$ signals, $R_0x$, $G_0x$ and $B_0x$ signals, $H_1x$, $S_1x$ and $L_1x$ signals and $H_0x$, $S_0x$ and $L_0x$ signals (where $x=1$) are stored in the effective range pixel value memory 14. Averages of absolute differences between the $H_1x$, $S_1x$ and $L_1x$ signals and Hu, Su and Lu and absolute differences between the $H_0x$, $S_0x$ and $L_0x$ signals and Hu, Su and Lu are stored in the effective range memory 15 as an effective range dH, dS and dL. These averages are derived from the following equations:

$$dH=(|H_1x-Hu|+|H_0x-Hu|)\div 2$$

$$dS=(|S_1x-Su|+|S_0x-Su|)\div 2$$

$$dL=(|L_1x-Lu|+|L_0x-Lu|)\div 2$$

Figure 13:
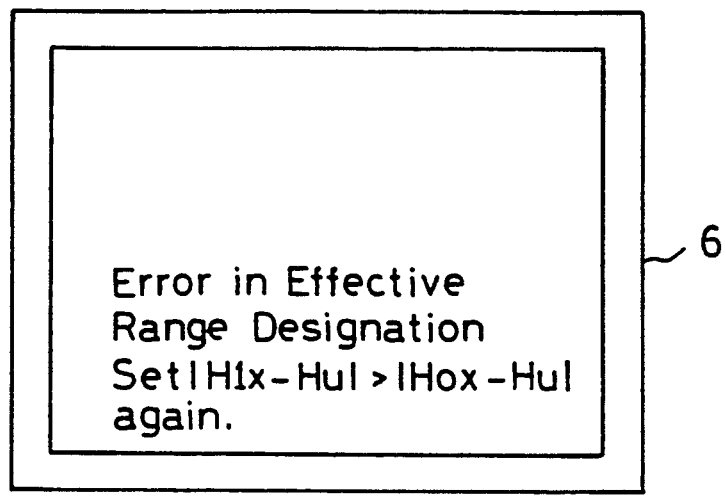
FIG. 13 is a view showing an example of error message with a type of error made when designating pixels to define an effective range.

When $|H_1x-Hu|>|H_0x-Hu|$, the apparatus determines that this is a designation error made by the operator. Then, as shown in FIG. 13, an error message with a type of error is displayed on the control monitor 6 or the like, prompting the operator to designate pixels again. This is a case where the pixel designated as an example for which the color correction is not desired lies within the effective range designated for color correction, which is contradictory for the purpose of processing. This apparatus takes account of the fact that the operator often refers to differences in hue when designating pixels. Hence, even when $|S_1x-Su|>|S_0x-Su|$ or $|L_1x-Lu|>|L_0x-Lu|$, the apparatus does not regard this as an error but computes the effective range dH, dS and dL. However, for the sake of strictness, designated values for saturation and lightness may also be checked as for hue.

(4) Where a plurality of pixels are designated as examples for color correction, the $R_1x$, $G_1x$ and $B_1x$ signals and $H_1x$, $S_1x$ and $L_1x$ signals (where x is the number of pixels designated) are stored in the effective range pixel value memory 14. Maximum values are obtained from among absolute differences between the $H_1x$, $S_1x$ and $L_1x$ signals and Hu, Su and Lu. The maximum values ($|H_1x-Hu|_{MAX}$, $|S_1x-Su|_{MAX}$ and $|L_1x-Lu|_{MAX}$) multiplied by α ($α>1$) are stored in the effective range memory 15 as an effective range dH, dS and dL. These values are derived from the following equations:

$$dH=|H_1x-Hu|_{MAX}\times α$$

$$dS=|S_1x-Su|_{MAX}\times α$$

$$dL=|L_1x-Lu|_{MAX}\times α$$

(5) Where a plurality of pixels are designated as examples of pixels for which a color correction is not desired, the $R_0x$, $G_0x$ and $B_0x$ signals and $H_0x$, $S_0x$ and $L_0x$ signals (where x is the number of pixels designated) are stored in the effective range pixel value memory 14. Minimum values are obtained from among absolute differences between the $H_0x$, $S_0x$ and $L_0x$ signals and Hu, Su and Lu, and are stored in the effective range memory 15 as an effective range dH, dS and dL. These values are derived from the following equations;

$$dH=|H_0x-Hu|_{MIN}$$

$$dS=|S_0x-Su|_{MIN}$$

$$dL=|L_0x-Lu|_{MIN}$$

(6) Where a plurality of pixels are designated as examples for color correction, and a plurality of pixels as examples of pixels for which the color correction is not desired, the $R_1x$, $G_1x$ and $B_1x$ signals, $R_0x$, $G_0x$ and $B_0x$ signals, $H_1x$, $S_1x$ and $L_1x$ signals, and $H_0x$, $S_0x$ and $L_0x$ signals (where x is the number of pixels designated) are stored in the effective range pixel value memory 14. Maximum values are obtained from among absolute differences between the $H_1x$, $S_1x$ and $L_1x$ signals and Hu, Su and Lu. Minimum values are obtained from among absolute differences between the $H_0x$, $S_0x$ and $L_0x$ signals and Hu, Su and Lu. Averages of the maximum values ($|H_1x-Hu|_{MAX}$, $|S_1x-Su|_{MAX}$ and $|L_1x-Lu|_{MAX}$) and minimum values ($|H_0x-Hu|_{MIN}$, $|S_0x=Su|_{MIN}$ and $|L_0x-Lu|_{MIN}$) are stored in the effective range memory 15 as an effective range dH, dS and dL. These averages are derived from the following equations:

$$dH=(|H_1x-Hu|_{MAX}+|H_0x-Hu|_{MIN})\div 2$$

$$dS=(|S_1x-Su|_{MAX}+|S_0x-Su|_{MIN})\div 2$$

$$dL=(|L_1x-Lu|_{MAX}+|L_0x-Lu|_{MIN})\div 2$$

When $|H_1x-Hu|_{MAX}>|H_0x-Hu|_{MIN}$, error processing is carried out as in the case (3) above.

Next, the RGB signals of pixels in the original image stored in the first frame memory 10 are successively read and temporarily stored in the second pixel value memory 20.

If the number of pixels in the horizontal direction of the first frame memory 10 is x and that in the vertical direction thereof is y, Rij, Gij and Bij signals of pixels ij ($i=1, 2, \ldots x$, $j=1, 2 \ldots y$) are successively stored in the second pixel value memory 20. Then, Rij, Gij and Bij signals in the m-bits after deleting the several lower bits, as in the case of the first pixel value memory 11, are outputted to the lookup table 17. The corresponding values Hij, Sij and Lij in n-bits are stored in a different storage region of the second pixel value memory 20.

A comparator 21 compares Hu, Su and Lu stored in the first pixel value memory 11 and Hij, Sij and Lij successively stored in the second pixel value memory 20, to determine whether the absolute differences therebetween are larger than the values of dH, dS and dL stored in the effective range memory 15. The comparisons are based on the expressions:

$$|Hij-Hu|<dH$$

$$|Sij-Su|<dS$$

$$|Lij-Lu|<dL$$

When all of the values of Hij, Sij and Lij satisfy the above comparison expressions (i.e. when the values in HSL color space of pixels ij read from the first frame memory 10 are in the effective range), the comparator 21 outputs a control signal to a color correction processor 22 to execute correction processing.

Conversely, when even one of Hij, Sij and Lij does not satisfy the above comparison expression (i.e. outside the effective range), the color correction processor 22 receives a control signal not to execute correction processing.

In response to the control signal to execute the processing, the color correction processor 22 reads the data of Hu, Su and Lu stored in the first pixel value memory 11, the data of Hij, Sij and Lij stored in the second pixel value memory 20, the data of dH, dS and dL stored in the effective range memory 15, and the data of kr, kg and kb stored in the parameter memory 18. Further, the color correction processor 22 carries out color correction processing, as described hereinafter, of the Rij, Gij and Bij signals (n-bit signals with no reduction in the number of bits) outputted from the second pixel value memory 20, and stores results in a second frame memory 23.

Upon receipt of the control signal not to execute the processing from the comparator 21, the color correction processor 22 stores the Rij, Gij and Bij signals outputted from the second pixel value memory 20 in the second frame memory 23 without correcting the signals.

The color correction processing should, basically, be carried out by multiplying the Rij, Gij and Bij signals of pixels ij determined to be the objects for processing, by kr, kg and kb computed by the parameter computing unit 12, and adding the products to the Rij, Gij and Bij signals. Then, the following problem could arise.

If execution or non-execution of the color correction processing is determined, with reference to the designated effective range, for a group of pixels in a portion of the original image where the RGB signals have smoothly varying values, the color may change abruptly across the group of smoothly varying pixels, resulting in an unnatural image. This is a phenomenon known as a tone jump.

To eliminate this problem, the following processing is carried out prior to the color correction processing.

First, absolute values $\Delta H$, $\Delta S$ and $\Delta L$ of the differences between the Hij, Sij and Lij data of Rij, Gij and Bij signals of pixels ij to be processed and the Hu, Su and Lu data of Ru, Gu and Bu signals of the color to be corrected are derived from the following equations:

$$|Hij - Hu| = \Delta H$$

$$|Sij - Su| = \Delta S$$

$$|Lij - Lu| = \Delta L$$

Coefficients for varying the parameters kr, kg and kb according to these differences are derived as follows:

$$1 - (\Delta H/dH) = kh$$

$$1 - (\Delta S/dS) = ks$$

$$1 - (\Delta L/dL) = kl$$

In the above equations, dH, dS and dL are values showing the effective range of color correction processing stored in the effective range memory 15, i.e. values showing a boundary between the pixels to be processed and other pixels.

Letters kh, ks and kl denote coefficients which approach a minimum "0" as $\Delta H$, $\Delta S$ and $\Delta L$ approach dH, dS and dL, and approach a maximum "1" as $\Delta H$, $\Delta S$ and $\Delta L$ approach "0", i.e. move away from dH, dS and dL.

Thus, when the coefficients kh, ks and kl are applied to the color correction parameters kr, kg and kb in the equations set out below, new parameters are obtained which make kr, kg and kb the smaller as they approach the boundary values (i.e. move away from the color to be corrected) and which approach the values of kr, kg and kb as they move away from the boundary values (toward the color to be corrected). These parameters are named KR, KG and KB.

$$KR = kr \cdot kh \cdot ks \cdot kl$$

$$KG = kg \cdot kh \cdot ks \cdot kl$$

$$KB = kb \cdot kh \cdot ks \cdot kl$$

By using the parameters KR, KG and KB in the color correction processing, a natural color correction is effected without the color of the image changing abruptly across the group of smoothly varying pixels. The letters and signs kh·ks·kl to the right side of the above parameters KR, KG and KB may be replaced with the square root of kh·ks·kl.

The color correction processor 22 carries out the color correction by adding, to the Rij, Gij and Bij signals of the pixels outputted from the second pixel value memory 20 to be processed, the products of these signals and the above parameters KR, KG and KB, as follows:

$$rij = Rij \cdot (1 + KR)$$

$$gij = Gij \cdot (1 + KG)$$

$$bij = Bij \cdot (1 - KB)$$

These rij, gij and bij are color component signals of the pixels ij after the color correction processing, and are stored in the second frame memory 23.

The image signals resulting from the color correction processing and stored in the second frame memory 23 and the image (original image) signals before the processing stored in the first frame memory 10 are selectively outputted to and displayed on the image monitor 3 by an internal switch SW of the data input device 4 operable by a switch or the like of the mouse 8.

This is convenient in practice since the images before and after the correction can be alternately observed for comparison.

The images before and after the correction may be displayed side by side in a split screen mode on the image monitor 3.

The color-corrected image corresponding to one frame and stored in the second frame memory 23 are outputted to the output scanner 5 after a RGB/CMYK conversion, and recorded on the film F (FIG. 1). While the output scanner 5 is connected to the apparatus so that the RGB signals of the color-corrected image are outputted to the output scanner 5, the RGB signals of the color-corrected image may be outputted, for example, to the magneto-optical disk driver 1 for storage on a magneto-optical disk to be transferred to a separate plate-making system or the like. The medium for transferring the RGB signals of the color-corrected image to the separate plate-making system or the like is not limited to the magneto-optical disk but may be magnetic tape or the like.

According to this embodiment, the color correction processing is carried out only for the pixels within a designated effective range, which may be all pixels in an original image. That is, all pixels within a designated color range in one original image are subjected to the color correction processing. If this is inconvenient, the above processing may be effected only for a region designated with the mouse 8 or the like of the data input device 4.

SECOND EMBODIMENT

An apparatus in the second embodiment is adapted to carry out a tone correction for output signals where color components thereof are CMYK signals converted from RGB signals.

As does the apparatus in the first embodiment shown in FIG. 1, the apparatus includes, as main components thereof, an image monitor 3, a data input device 4, a drive unit 1 for driving a magneto-optical disk (i.e. a magneto-optical disk driver 1), a frame memory unit 2, an output scanner 5 and a computer 9.

The data input device 4 includes a control monitor 6, a keyboard 7 and a mouse 8.

Figure 14:
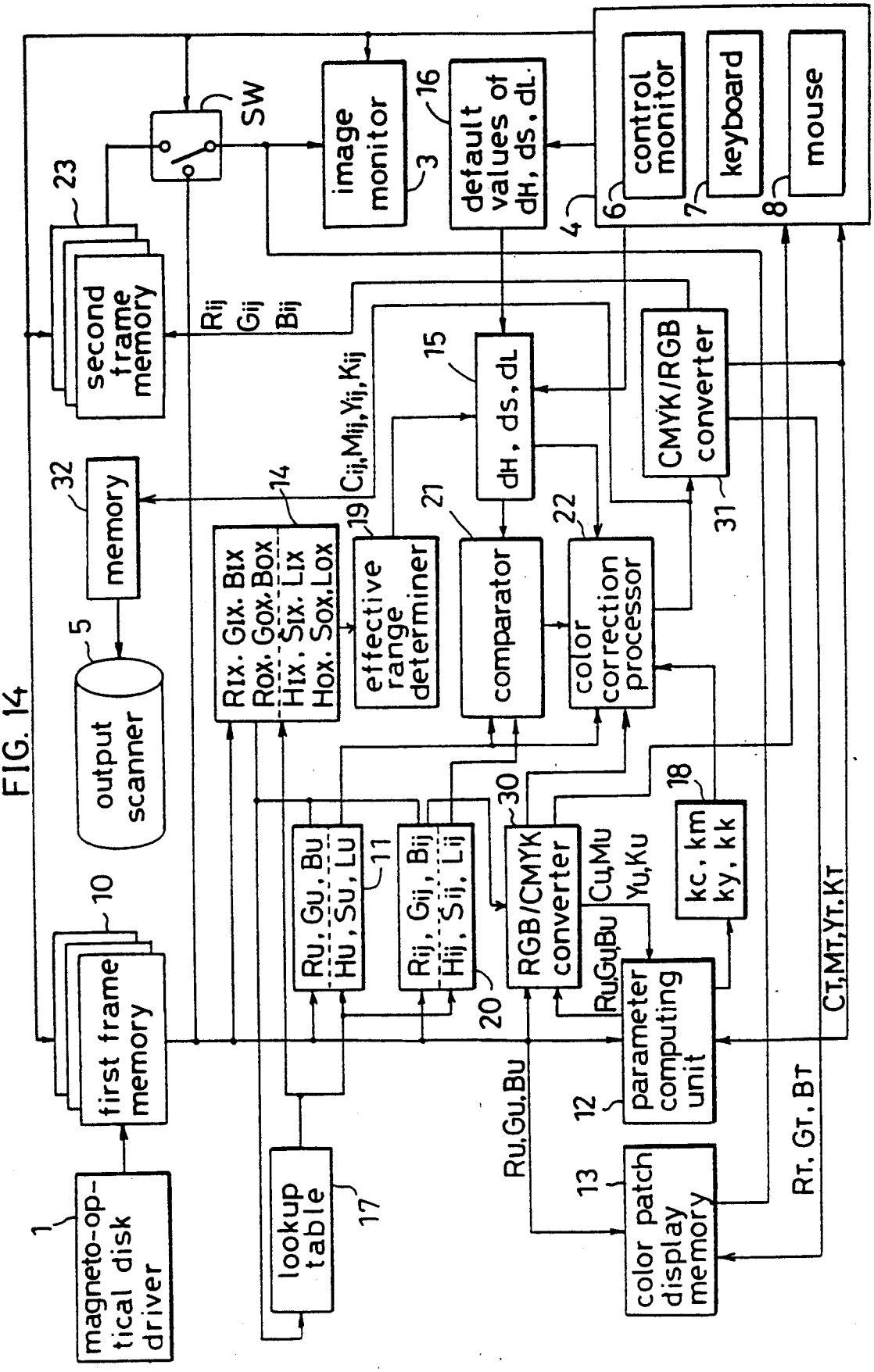
FIG. 14 is a block diagram showing an interior arrangement of an apparatus in the second embodiment.

FIG. 14 is a block diagram of a system of this apparatus. The construction and operation of this apparatus will be described with reference to this block diagram, and in combination with controls made by the operator. The following description will be centered on the difference between the apparatus in the first embodiment (FIG. 2) and this apparatus.

First, the operator inputs RGB signals of a color to be corrected.

This designation may be made with the mouse 8 while looking at an original image displayed on the image monitor 3 (see FIG. 3), or by inputting numeric values of RGB signals directly through the keyboard 7 (see FIGS. 5A and 5B). The RGB signals (Ru, Gu and Bu signals) of the color to be corrected are stored in a first frame memory 10, and outputted to a color patch display memory 13. Further, these signals are supplied also to the data input device 4 after being converted to CMYK signals by a RGB/CMYK converter 30.

The color patch memory 13 stores the Ru, Gu and Bu signals at addresses corresponding to a predetermined region on the screen of the image monitor 3. These signals are outputted to the image monitor 3 to display a color patch of the color to be corrected as superposed on the original image (FIG. 7).

The RGB/CMYK converter 30 converts the RGB signals (i.e. Rx, Gx and Bx) supplied thereto as above into CMYK signals (i.e. Cx, Mx, Yx and Kx), and outputs the latter. This conversion is based on the following equations, for example:

$$Cx = a_{11}Rx - a_{12}Gx - a_{13}Bx$$

$$Mx = -a_{21}Rx - a_{22}Gx - a_{23}Bx$$

$$Yx = -a_{31}Rx - a_{32}Gx - a_{33}Bx$$

$$Kx = MAX(Cx, Mx, Yx)$$

where $a_{ij}$ (i=1 to 3, j=1 to 3) is a predetermined coefficient (positive value), and E (Cx, Mx, Yx) is a function to pick out the greatest of Cx, Mx and Yx.

The RGB/CMYK converter 30 may include a table of relationships to the RGB signals of the CMYK signals derived from the above conversion expressions.

The data input device 4 having received the CMYK signals corresponding to the Ru, Gu and Bu signals converts the CMYK signals into numeric values, and outputs the values to the control monitor 6 for display.

Where, for example, the CMYK signals are 8-bit digital signals, the signals may be expressed by the numeric values "0 to 255" or by values in percentage "0 to 100(%)" corresponding to the values "0 to 255".

Figure 15A:
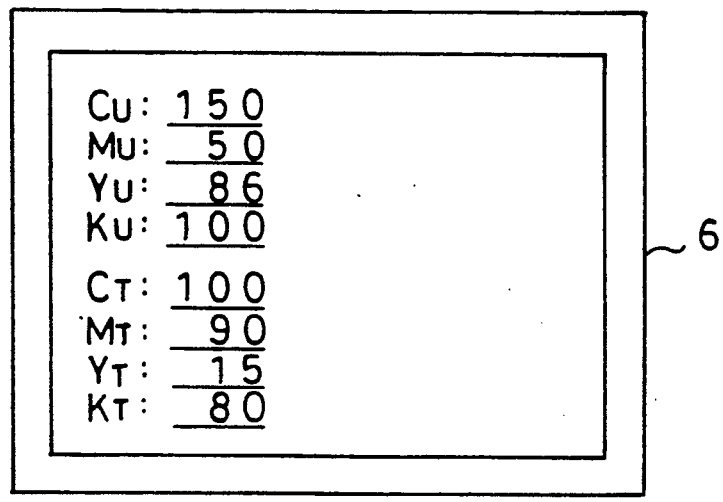
FIGS. 15A and 15B are views each showing an example of input screens for inputting numeric values of CMYK signals to designate a target color.
Figure 15B:
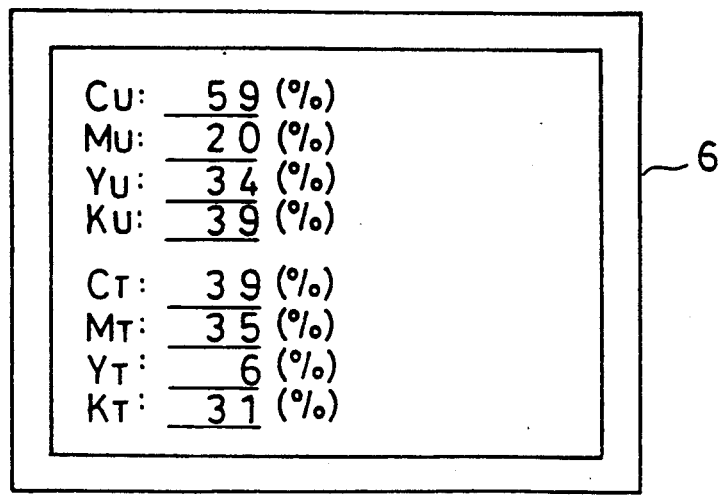

The operator refers to the color patch of the color to be corrected as displayed on the image monitor 3, and the numeric values of CMYK signals corresponding to Ru, Gu and Bu signals and displayed on the control monitor 6, and inputs through the keyboard 7 numeric values of CMYK signals (target signals) of a color resulting from correction processing (hereinafter called a target color) as shown in FIG. 15A (in the expression of "0 to 255") and FIG. 15B (in the expression of "0 to 100(%)").

The data input device 4 produces CMYK signals corresponding to the values inputted, and outputs the signals to a parameter computing unit 12 and a CMYK/RGB converter 31. The latter converts the CMYK signals to RGB signals for output to the color patch display memory 13. The CMYK signals of the target color are hereinafter called Ct, Mt, Yt and Kt signals, and the RGB signals converted from the Ct, Mt, Yt and Kt signals are called Rt, Gt and Bt signals.

The color patch display memory 13 stores the Rt, Gt and Bt signals in a storage location having a storage region corresponding to the one storing the Ru, Gu and Bu signals. The Rt, Gt and Bt signals are outputted to the image monitor 3 for display of a color patch of the target color in superposition on the original image (see FIG. 7).

In this way, once the operator inputs the values of Ct, Mt, Yt and Kt signals, the image (color patch) of RGB signals corresponding to these values appears in real time on the image monitor 3. This enables the operator to grasp instantly a correlation between the numeric values of the Ct, Mt, Yt and Kt signals designated and a target color envisaged by the operator. If the color patch differs from the target color envisaged, the operator may vary the numeric vales of Ct, Mt, Yt and Kt signals to designate the target color easily and accurately.

The CMYK/RGB converter 31 converts the CMYK signals supplied thereto into RGB signals as noted hereinbefore. This conversion is done by a known conversion expression using Neugebauer equation, for example.

The CMYK/RGB converter 31 may include a table of relationships to the CMYK signals of the RGB signals derived from the known conversion expressions.

When designation of the color to be corrected and target color is completed, the operator designates an effective range of correction from the original color to the target color.

In this apparatus, as in the first embodiment, an effective range is determined by using HSL values (see FIG. 10) or designating a pixel or pixels in the original image (FIG. 11), or by using default values instead of designating an effective range. The operator selects the effective range designation with the HSL values, or with a pixel or pixels in the original image, or use of the default values, on a menu screen displayed on the control monitor 6 through the keyboard 7 or otherwise (see FIG. 9).

The method of each designation mode is the same as in the first embodiment, and will not particularly be described again.

This apparatus determines, prior to execution of color correction processing of the CMYK signals converted from the RGB signals of pixels in the original image, whether the color components of pixels in the original image stored in the first frame memory 10 are in the effective range of color correction or not. This determination is based on the information thus far inputted or extracted, i.e. "the RGB signals of the color to be corrected (Ru, Gu and Bu signals)", "the CMYK signals of the target color (Ct, Mt, Yt and Kt signals)" and "the HSL values showing an effective range of color correction, the pixels showing an effective range of color correction, or the default values of the effective range where no effective range is designated".

In this apparatus also, a lookup table 17 is used to determine whether the color components of pixels in the original image are in the effective range of color correction designated- As in the first embodiment, several lower bits may be deleted from the n-bits forming the RGB signals to make m-bits, and the values of H, S and L corresponding to the RGB signals in m-bits may be stored in the lookup table 17.

First, only the m-bits left after deleting the several lower bits from the Ru, Gu and Bu signals (in n-bits) of the color to be corrected stored in the first pixel value memory 11 are outputted to the lookup table 17 to obtain the HSL values in n-bits. These are expressed as Hu, Su and Lu. The values Hu, Su and Lu are stored in a different storage region of the first pixel value memory 11.

The parameter computing unit 12 having received the Ru, Gu and Bu signals of the color to be corrected and the Ct, Mt, Yt and Kt signals of the target color applies the Ru, Gu and Bu signals of the color to be corrected to the RGB/CMYK converter 30 to obtain conversion signals (Cu, Mu, Yu and Ku signals) to be converted, and derives from the following equations parameters kc, km, ky and kk necessary to the color correction processing:

$$kc = Ct/Cu - 1$$

$$km = Mt/Mu - 1$$

$$ky = Yt/Yu - 1$$

$$kk = Kt/Ku - 1$$

The parameters kc, km, ky and kk are stored in a parameter memory 18.

Next, the RGB signals of pixels in the original image stored in the first frame memory 10 are successively read and temporarily stored in a second pixel value memory 20.

If the number of pixels in the horizontal direction of the first frame memory 10 is x and that in the vertical direction thereof is y, Rij, Gij and Bij signals of pixels ij (i=1, 2...x, j=1, 2...y) are successively stored in the second pixel value memory 20. Then, Rij, Gij and Bij signals in the m-bits after deleting the several lower bits, as in the case of the first pixel value memory 11, are outputted to the lookup table 17. The corresponding values Hij, Sij and Lij in n-bits are stored in a different storage region of the second pixel value memory 20.

The Rij, Gij and Bij signals (original n-bit signals retaining the several lower bits) are converted into CMYK signals (Cij, Mij, Yij and Kij signals) by the RGB/CMYK converter 30 which are outputted to a color correction processor 22.

A comparator 21 compares the Hu, Su and Lu stored in the first pixel value memory 11 and the Hij, Sij and Lij successively stored in the second pixel value memory 20, to determine whether the absolute differences therebetween are larger than the values of dH, dS and dL stored in the effective range memory 15. The comparisons are based on the expressions:

$$|Hij - Hu| < dH$$

$$|Sij - Su| < dS$$

$$|Lij - Lu| < dL$$

When all of the values of Hij, Sij and Lij satisfy the above comparison expressions (i.e. when the values in HSL color space of pixels ij read from the first frame memory 10 are in the effective range), the comparator 21 outputs a control signal to a color correction processor 22 to execute correction processing.

Conversely, when even one of Hij, Sij and Lij does not satisfy the above comparison expression (i.e. outside the effective range), the color correction processor 22 receives a control signal not to execute correction processing.

In response to the control signal to execute the processing, the color correction processor 22 reads the data of Hu, Su and Lu stored in the first pixel value memory 11, the data of Hij, Sij and Lij stored in the second pixel value memory 20, the data of dH, dS and dL stored in the effective range memory 15, and the data of kc, km, ky and kk stored in the parameter memory 18. The Cij, Mij, Yij and Kij signals supplied from the second pixel value memory 20 through the RGB/CMYK converter 30 are subjected to color correction processing as described hereinafter. The CMYK signals resulting from the processing are stored in a separate memory 32, and the RGB signals converted from the same signals by the CMYK/RGB converter 31 are stored in a second frame memory 23.

Upon receipt of the control signal not to execute the processing from the comparator 21, the color correction processor 22 outputs the Cij, Mij, Yij and Kij signals supplied from the RGB/CMYK converter 30 for storage in the separate memory 32. The RGB signals converted from the same signals by the CMYK/RGB converter 31 are stored in the second frame memory 23.

The color correction processing should, basically, be carried out by multiplying the Cij, Mij, Yij and Kij signals of pixels ij determined to be the objects to be processed, by kc, Pan, ky and kk computed by the parameter computing unit 12, and adding the products to the Cij, Mij, Yij and Kij signals. Then, a tone jump phenomenon will be encountered as described in the first embodiment.

To eliminate this problem, the following parameter correction processing is carried out prior to the color correction processing.

First, absolute values $\Delta H$, $\Delta S$ and $\Delta L$ of the differences between the Hij, Sij and Lij data of Rij, Gij and Bij signals of pixels ij to be processed and the Hu, Su and Lu data of Ru, Gu and Bu signals of the color to be corrected are derived from the following equations:

$$|Hij - Hu| = \Delta H$$

$$|Sij - Su| = \Delta S$$

$$|Lij - Lu| = \Delta L$$

Coefficients for varying the parameters kc, km, ky and kk according to these differences are derived as follows:

$$1 - (\Delta H/dH) = kh$$

$$1 - (\Delta S/dS) = ks$$

$$1 - (\Delta L/dL) = kl$$

Letters kh, ks and kl denote coefficients which approach a minimum "0" as $\Delta H$, $\Delta S$ and $\Delta L$ approach dH, dS and dL, and approach a maximum "1" as $\Delta H$, $\Delta S$ and $\Delta L$ approach "0", i.e. move away from dH, dS and dL.

Thus, when the coefficients kh, ks and kl are applied to the color correction parameters kc, km, ky and kk in the equations set out below, new parameters are obtained which make kc, km, ky and kk the smaller as they approach the boundary values (i.e. move away from the color to be corrected) and which approach the values of kc, km, ky and kk as they move away from the boundary values (toward the color to be corrected). These parameters are named KC, KM, KY and KK.

$$KC = kc \cdot kh \cdot ks \cdot kl$$

$$KM = km \cdot kh \cdot ks \cdot kl$$

$$KY = ky \cdot kh \cdot ks \cdot kl$$

$$KK = kk \cdot kh \cdot ks \cdot kl$$

By using the parameters KC, KM, KY and KK in the color correction processing, a natural color correction is effected without the color of an image changing abruptly across a group of smoothly varying pixels. The letters and signs kh·ks·kl to the right side of the above parameters KC, KM, KY and KK may be replaced with the square root of kh·ks·kl.

The color correction processor 22 carries out the color correction by adding, to the Cij, Mij, Yij and Kij signals which are CMYK signals of the pixels outputted from the second pixel value memory 20 to be processed and converted by the RGB/CMYK converter 30, the product of the Cij, Mij, Yij and Kij signals and the above parameters KC, KM, KY and KK.

$$cij = Cij \cdot (1 + KC)$$

$$mij = Mij \cdot (1 + KM)$$

$$yij = Yij \cdot (1 - KY)$$

$$kij = Kij \cdot (1 - KK)$$

These cij, mij, yij and kij are CMYK signals of the pixels ij after the color correction processing, and are stored in the separate memory 32.

The image signals resulting from the color correction processing and stored in the second frame memory 23 (Rij, Gij and Bij signals converted by CMYK/RGB converter 31 after being outputted from the color correction processor 22) and the image (original image) signals before the processing stored in the first frame memory 10 are selectively outputted to and displayed on the image monitor 3 by an internal switch SW of the data input device 4 operable by a switch or the like of the mouse 8.

This is convenient in practice since the image before the correction and an approximation of the image after the correction can be alternately observed for comparison. These images may be displayed side by side in a split screen mode on the image monitor 3.

If the color-corrected image displayed on the image monitor 3 has the color envisaged, the operator gives an instruction to output the color-corrected Cij, Mij, Yij and Kij signals stored in the separate memory 32 to the output scanner 5 for printing on the film F. These signals may be outputted to a film recorder or a hard copy unit instead.

The Cij, Mij, Yij and Kij signals of the color-corrected image may be outputted, for example, to the magneto-optical disk driver 1 for storage on a magneto-optical disk to be transferred to a separate plate-making system or the like. The medium for transferring the RGB signals of the color-corrected image to the separate plate-making system or the like is not limited to the magneto-optical disk but may be magnetic tape or the like.

According to this embodiment, the color correction processing is carried out only for the pixels within a designated effective range, which may be all pixels in an original image. That is, all pixels within a designated color range in one original image are subjected to the color correction processing. If this is inconvenient, the above processing may be effected only for a region designated with the mouse 8 or the like of the data input device 4.

In the above embodiment, the operator designates one set of a color to be corrected (signals to be corrected) and a target color (target signals). However, color correction processing may be effected for plural sets of colors to be corrected (signals to be corrected) and target colors (target signals). This may further promote the color correcting precision.

The system described in the above embodiment may be incorporated into a plate-making color scanner. That is, the RGB signals of an original image color-separated by an input scanner are inputted to the first frame memory 10 in this embodiment, and the Cij, Mij, Yij and Kij signals stored in the separate memory 32 after the varied processes shown in the system block diagram of FIG. 14 are supplied to an output scanner. Where a color correction is effected in the color scanner having such a construction, the complex operations carried out for the conventional color correction are no longer required, thereby to provide for an efficient plate-making process.

The present invention may be embodied in other specific forms without departing from the spirit or essential attributes thereof and, accordingly, reference should be made to the appended claims, rather than to the foregoing specification, as indicating the scope of the invention.

What is claimed is:

1. A color tone correcting apparatus for effecting a color tone correction of an original image, where color components of output signals are signals (RGB signals) of R (red), G (green) and B (blue), by converting the RGB signals into RGB signals of a target color, said apparatus comprising:

original image data storage means for storing digitalized RGB signals of pixels in said original image;

an image data conversion table for converting said RGB signals into three attribute values (i.e. hue H, saturation S and lightness L: HSL values) of perceived colors;

processing condition designating means for designating a color to be corrected and to act as a central object for tone correction processing, and for designating a target color resulting from the tone correction;

effective range determining means for determining, from the HSL values, an effective range of the tone correction processing with reference to said color to be corrected;

parameter computing means for computing parameters for use in the tone correction processing based on said color to be corrected and said target color designated by said processing condition designating means;

object pixel determining means for determining pixels subjected to the tone correction processing by comparing the HSL values obtained by applying said RGB signals of pixels in said original image stored in said original image data storage means to said image data conversion table, and the HSL values determined by said effective range determining means and indicative of the effective range of tone correction processing; and tone correction processing means for effecting the tone correction processing by applying the parameters computed by said parameter computing means to the RGB signals of pixels determined by said object pixel determining means to be objects of the tone correction processing.

2. An apparatus as defined in claim 1, further comprising display means for displaying said original image upon receipt of the RGB signals of said original image stored in said original image data storage means.

3. An apparatus as defined in claim 2, wherein said display means is operable to highlight all of the pixels in said original image displayed that correspond to the RGB signals of said color to be corrected as designated by said processing condition designating means.

4. An apparatus as defined in claim 2, wherein said processing condition designating means is operable to designate said color to be corrected, with a pixel in said original image displayed on said display means, and to extract the RGB signals of said color to be corrected from said original image data storage means based on an address of the pixel designated.

5. An apparatus as defined in claim 2, wherein said processing condition designating means is operable, based on an address of a pixel in said original image designated, to extract the RGB signals of said pixel designated and adjacent pixels from said original image data storage means, and to regard averages of the RGB signals as RGB signals of the color to be corrected.

6. An apparatus as defined in claim 2, wherein said display means is operable to display, in superposition in a predetermined region on a screen showing the original image, the color to be corrected and to act as the central object for the tone correction processing and the target color resulting from the tone correction, as designated by said processing condition designating means.

7. An apparatus as defined in claim 2, wherein said effective range determining means is operable to determined the effective range of the tone correction processing from the HSL values with reference to said color to be corrected, said HSL values being obtained by applying to said image data conversion table the RGB signals of pixels showing the effective range of the tone correction processing designated with a pixel in said original image displayed on said display means.

8. An apparatus as defined in claim 7, wherein said effective range determining means is operable to determine the effective range of the tone correction processing from at least one example of pixels designated for undergoing the tone correction processing.

9. An apparatus as defined in claim 8, wherein said effective range determining means is operable to determine the effective range of the tone correction processing from the HSL values with reference to said color to be corrected, by computing absolute values of differences between the HSL values obtained by applying, to said image data conversion table, the RGB signals of the pixels designated as the examples of pixels to be subjected to the one correction processing, and the HSL values obtained by applying, to said image data conversion table, the RGB signals of the color to be corrected as designated by said processing condition designating means, selecting maximum absolute values of the differences from among the pixels designated as examples of pixels to be subjected to the tone correction processing, and multiplying the selected maximum absolute values of the differences by a predetermined coefficient.

10. An apparatus as defined in claim 7, wherein said effective range determining means is operable to determine the effective range of the tone correction processing from at least one example of pixels designated for exclusion from the tone correction processing.

11. An apparatus as defined in claim 10, wherein said effective range determining means is operable to determine the effective range of the tone correction processing from the HSL values with reference to said color to be corrected, by computing absolute values of differences between the HSL values obtained by applying, to said image data conversion table, the RGB signals of the pixels designated as the examples of pixels to be excluded from the tone correction processing, and the HSL values obtained by applying, to said image data conversion table, the RGB signals of the color to be corrected as designated by said processing condition designating means, and selecting minimum absolute values of the differences from among the pixels designated as examples of pixels to be excluded from the tone correction processing.

12. An apparatus as defined in claim 7, wherein said effective range determining means is operable to determine the effective range of the tone correction processing from at least one example of pixels designated for undergoing the tone correction processing, and at least one example of pixels designated for exclusion from the tone correction processing.

13. An apparatus as defined in claim 12, wherein said effective range determining means is operable to determine the effective range of the tone correction processing from the HSL values with reference to said color to be corrected, by computing absolute values of differences between the HSL values obtained by applying, to said image data conversion table, the RGB signals of the pixels designated as the examples of pixels to be subjected to the tone correction processing, and the HSL values obtained by applying, to said image data conversion table, the RGB signals of the color to be corrected as designated by said processing condition designating means, selecting maximum absolute values of the differences from among the pixels designated as examples of pixels to be subjected to the tone correction processing, computing absolute values of differences between the HSL values obtained by applying, to said image data conversion table, the RGB signals of the pixels designated as the examples of pixels to be excluded from the tone correction processing, and the HSL values obtained by applying, to said image data conversion table, the RGB signals of the color to be corrected as designated by said processing condition designating means, selecting minimum absolute values of the differences from among the pixels designated as examples of pixels to be excluded from the tone correction processing, and computing averages of the selected maximum absolute values of the differences and the selected minimum absolute values of the differences.

14. An apparatus as defined in claim 1, wherein said processing condition designating means is operable to designate said color to be corrected with numeric values of said RGB signals.

15. An apparatus as defined in claim 1, wherein said processing condition designating means is operable to designate said target color with numeric values of said RGB signals.

16. An apparatus as defined in claim 1, wherein said effective range determining means is operable to determine the effective range of the tone correction processing from the HSL values designated.

17. An apparatus as defined in claim 1, wherein said processing condition designating means is operable to determine the effective range of the tone correction processing with default values of the HSL values.

18. An apparatus as defined in claim 1, wherein said parameter computing means is operable to derive parameters kr, kg and kb from the following equations:

$$kr = Rt/Ru - 1$$

$$Kg = Gt/Gu - 1$$

$$kb = Bt/Bu - 1$$

where Ru, Gu and Bu are the RGB signals of the color to be corrected, and Rt, Gt and Bt are the RGB signals of the target color.

19. An apparatus as defined in claim 1, wherein said tone correction processing means is operable to effect the tone correction processing by adding, to the RGB signals of pixels determined to be the objects of the tone correction processing, values obtained by multiplying the RGB signals by the parameters.

20. An apparatus as defined in claim 1, further comprising parameter amending means for computing differences between the HSL values of pixels corresponding to the color to be corrected and the HSL values of pixels determined by said object pixel determining means to be subjected to the tone correction processing, and amending said parameters for the tone correction processing such that the larger the differences are, the smaller the parameters are made.

21. An apparatus as defined in claim 11, wherein said parameter amending means is operable to amend the parameters by computing absolute values of differences between the HSL values of pixels corresponding to the color to be corrected and the HSL values of pixels determined by said object pixel determining means to be subjected to the tone correction processing, deriving coefficients (kh, ks, kl) for varying the parameters (kr, kg, kb) according to the absolute values (ΔH, ΔS, ΔL) of differences from the following equations using the HSL values (d H, dS, dL) showing the effective range of the tone correction processing:

$$kh = 1 - (\Delta H/dH)$$

$$ks = 1 - (\Delta S/dS)$$

$$kl = 1 - (\Delta L/dL)$$

and applying the coefficients (kh, ks, kl) derived to components of the parameters (kr, kg, kb).

22. An apparatus as defined in claim 21, wherein said parameter amending means is operable to amend the parameters by multiplying the components of the parameters kr, kg and kb by a product (kh·ks·kl) of the coefficients (kh, ks, kl).

23. An apparatus as defined in claim 21, wherein said parameter amending means is operable to amend the parameters by multiplying the components of the parameters kr, kg and kb by the square root of a product (kh·ks·kl) of the coefficients (kh, ks, kl).

24. A color tone correcting apparatus for effecting a color tone correction of an original image, where color components of output signals are signals (CMYK signals) of C (cyan), M (magenta), Y (yellow) and K (black), by converting the CMYK signals into CMYK signals of a target color, said apparatus comprising:

original image data storage means for storing digitalized color component signals (RGB signals) of R (red), G (green) and B (blue) of pixels in said original image;

RGB/CMYK converting means for converting said RGB signals into said CMYK signals;

an image data conversion table for converting said RGB signals into three attribute values (i.e. hue H, saturation S and lightness L: HSL values) of perceived colors;

processing condition designating means for designating RGB signals (signals to be corrected) of a color to be corrected and to act as a central object for tone correction processing from the RGB signals stored in said original image data storage means, and for designating CMYK signals (target signals) of a target color resulting from the tone correction effected for said color to be corrected;

effective range determining means for determining, from the HSL values, an effective range of the tone correction processing with reference to said color to be corrected;

parameter computing means for computing parameters for use in the tone correction processing based on CMYK signals for the tone correction converted by said RGB/CMYK converting means from the signals designated by said processing condition designating means to be corrected, and said target signals designated by said processing condition designating means;

object pixel determining means for determining pixels subjected to the tone correction processing by comparing the HSL values obtained by applying said RGB signals of pixels in said original image stored in said original image data storage means to said image data conversion table, and the HSL values determined by said effective range determining means and indicative of the effective range of tone correction processing; and tone correction processing means for effecting the tone correction processing by applying the parameters computed by said parameter computing means to the CMYK signals of pixels determined by said object pixel determining means to be objects of the tone correction processing among the CMYK signals obtained by successively applying the RGB signals of pixels of the original image stored in said original image data storage means to said RGB/CMYK converting means.

25. An apparatus as defined in claim 24, further comprising display means for displaying said original image upon receipt of the RGB signals of said original image stored in said original image data storage means.

26. An apparatus as defined in claim 25, wherein said processing condition designating means is operable to designate said signals to be corrected, with a pixel in said original image displayed on said display means, and to extract the RGB signals of said color to be corrected from said original image data storage means based on an address of the pixel designated.

27. An apparatus as defined in claim 26, wherein said processing condition designating means is operable, based on an address of a pixel in said original image of the designated signals to be corrected, to extract the RGB signals of said pixel designated and adjacent pixels from said original image data storage means, and to regard averages of the RGB signals as RGB signals of the color to be corrected.

28. An apparatus as defined in claim 25, wherein said effective range determining means is operable to determine the effective range of the tone correction processing from the HSL values with reference to said color to be corrected, said HSL values being obtained by applying to said image data conversion table the RGB signals of pixels showing the effective range of the tone correction processing designated with a pixel in said original image displayed on said display means.

29. An apparatus as defined in claim 24, wherein said processing condition designating means is operable to designate said target signals with numeric values of said CMYK signals.

30. An apparatus as defined in claim 24, wherein said effective range determining means is operable to determine the effective range of the tone correction processing from the HSL values designated.

31. An apparatus as defined in claim 24, wherein said processing condition designating means is operable to designate said signals to be corrected with numeric values of said RGB signals.

32. An apparatus as defined in claim 24, wherein said processing condition designating means is operable to determine the effective range of the tone correction processing with default values of the HSL values.

33. An apparatus as defined in claim 24, further comprising parameter amending means for computing differences between the HSL values of pixels corresponding to the signals to be corrected and the HSL values of pixels determined by said object pixel determining means to be subjected to the tone correction processing, and amending said parameters for the tone correction processing such that the larger the differences are, the smaller the parameters are made.

34. An apparatus as defined in claim 24, wherein said parameter computing means is operable to derive parameters kc, km, ky and kk from the following equations:

$$kc = Ct/Cu - 1$$

$$Km = Mt/Mu - 1$$

$$ky = Yt/Yu - 1$$

$$kk = Kt/Ku - 1$$

where Cu, Mu, Yu and Ku are the CMYK signals to be corrected which are converted by said RGB/CMYK converting means from the RGB signals of the color to be corrected, and Ct, Mt, Yt and Kt are the target signals.

35. An apparatus as defined in claim 24, wherein said tone correction processing means is operable to effect the tone correction processing by adding, to the CMYK signals obtained by applying the RGB signals of pixels determined to be the objects of the tone correction processing to said RGB/CMYK converting means, values obtained by multiplying the CMYK signals by the parameters.

36. An apparatus as defined in claim 24, wherein said parameter amending means is operable to amend the parameters by computing absolute values of differences between the HSL values of pixels corresponding to the signals to be corrected and the HSL values of pixels determined by said object pixel determining means to be subjected to the tone correction processing, deriving coefficients (kh, ks, kl) for varying the parameters (kc, km, ky, kk) according to the absolute values ($\Delta H$, $\Delta S$, $\Delta L$) of differences from the following equations using the HSL values (dH, dS, dL) showing the effective range of the tone correction processing:

$$kh = 1 - (\Delta H/dH)$$

$$ks = 1 - (\Delta S/dS)$$

$$kl = 1 - (\Delta L/dL)$$

and applying the coefficients (kh, ks, kl) derived to components of the parameters (kc, km, ky kk).

37. An apparatus as defined in claim 36, wherein said parameter amending means is operable to amend the parameters by multiplying the components kc, km, ky and kk by a product (kh·ks·kl) of the coefficients (kh, ks, kl).

38. An apparatus as defined in claim 36, wherein said parameter amending means is operable to amend the parameters by multiplying the components of the parameters kc, km, ky and kk by the square root of a product (kh·ks·kl) of the coefficients (kh, ks, kl)

* * * * *